Figure 1:
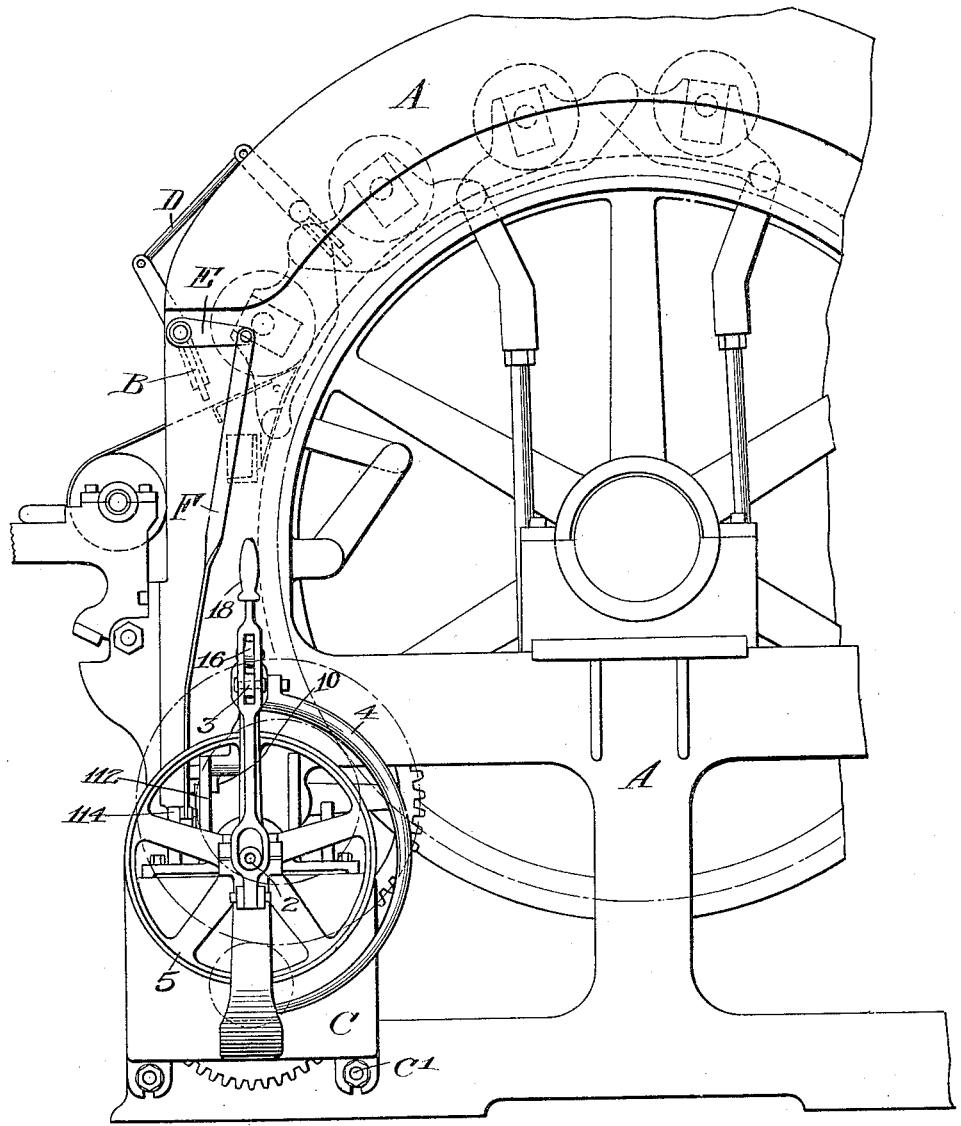

D. M. COOPER.
STOP MECHANISM FOR MACHINERY.
APPLICATION FILED DEC. 30, 1909.

1,103,867.

Patented July 14, 1914.
2 SHEETS—SHEET 1.

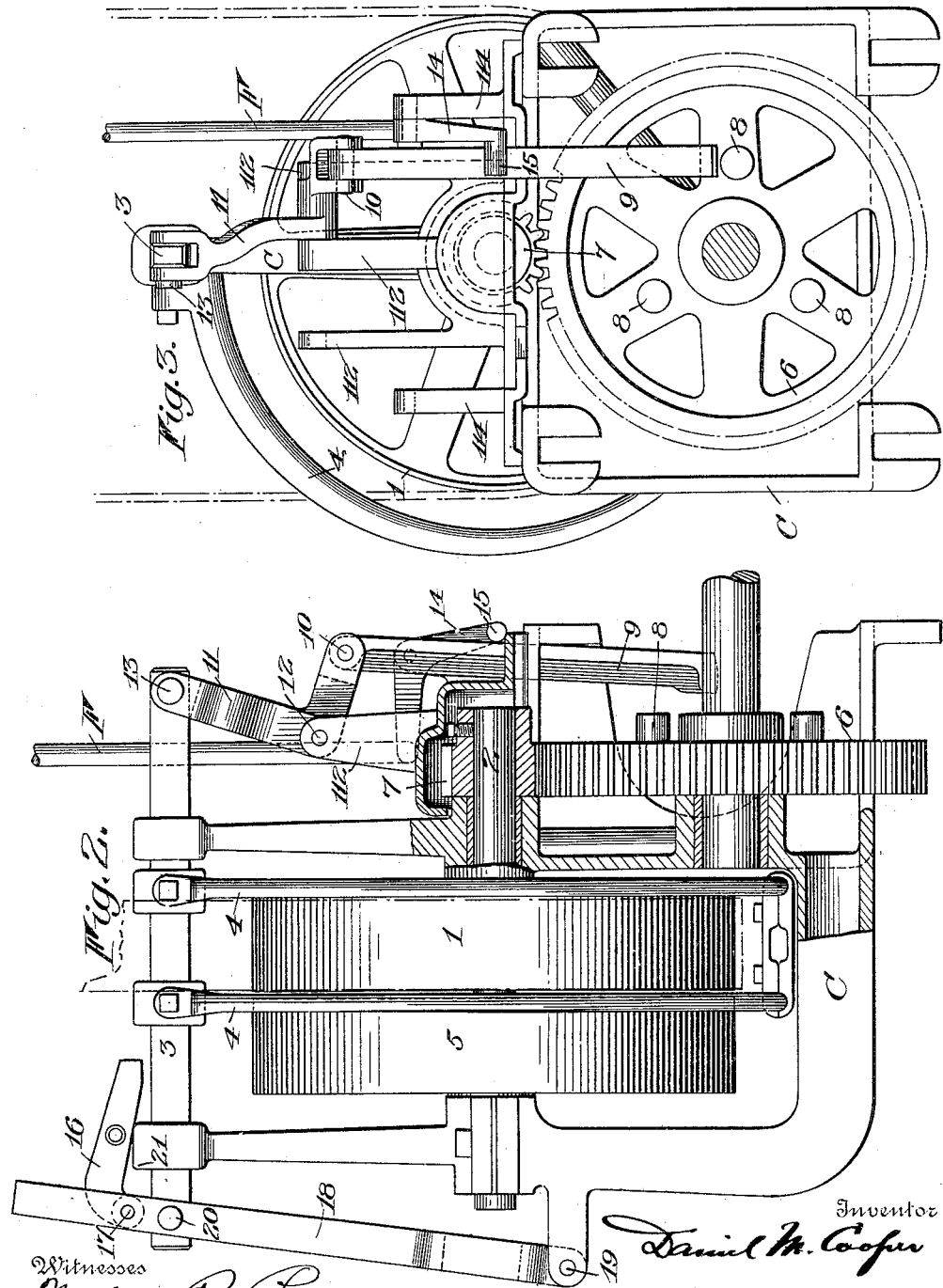

UNITED STATES PATENT OFFICE.

DANIEL M. COOPER, OF ROCHESTER, NEW YORK, ASSIGNOR, BY MESNE ASSIGNMENTS, TO AMERICAN LAUNDRY MACHINERY COMPANY, OF CINCINNATI, OHIO, A CORPORATION OF OHIO.

STOP MECHANISM FOR MACHINERY.

1,103,867.      Specification of Letters Patent.      Patented July 14, 1914.

Application filed December 30, 1909. Serial No. 535,564.

*To all whom it may concern:*

Be it known that I, DANIEL M. COOPER, of Rochester, in the county of Monroe and State of New York, have invented certain new and useful Improvements in Stop Mechanisms for Machinery; and I do hereby declare the following to be a full, clear, and exact description of the same, reference being had to the accompanying drawings, forming a part of this specification, and to the reference-numerals marked thereon.

The present invention relates to a mechanism for automatically cutting off a machine from the driving power whenever an accident or other abnormal condition in the machine takes place, and the object of this invention is to provide a construction which will be positive in its action and will not depend upon weights or springs for its operation.

To these and other ends the invention consists in certain improvements and combinations of parts all as will be hereinafter more fully described, the novel features being pointed out in the claims at the end of the specification.

In the drawings:—Figure 1 is a side view of a mangle to which the invention has been applied: Fig. 2 is an enlarged view of the stop mechanism showing parts in elevation and other parts in section, and Fig. 3 is a view of that end of the stop mechanism which is attached to the machine.

In the present embodiment of the invention the driving member is in the form of a belt, not shown, while the driven member is in the form of a pulley 1 fast upon the shaft 2. It is understood however that any other type of driving and driven member may be employed.

In order to make and break connection between the driving and the driven members there is employed a shifter which in this instance comprises a slide 3 carrying arms 4 to lie on opposite sides of the belt in order to shift the latter from the fast pulley 1 to a loose pulley 5 which turns upon the shaft 2 and prevents the latter from being driven when the belt is connected thereto.

The shifter is operated by a mechanism which receives its power from a part moving with the machine to be stopped. This part consists in the present instance of a rotary member 6 preferably in the form of a gear wheel meshing with a pinion 7 on the shaft 2 so as to be driven with the fast pulley of the stop mechanism. Carried on one face of the member are one or more laterally extending projections 8 which are adapted to effect the operation of a mechanism for moving the shifter. The latter mechanism preferably embodies a dog 9 pivotally connected at 10 to a movable or oscillatory member 11 consisting in this instance of a bell-crank lever pivoted at 12 to a bracket 112 on the frame of the machine above shaft 2 and having one arm carrying the dog 9 and the other arm pivotally connected at 13 to the slide 3 of the shifter. Normally, the dog hangs by gravity out of the path of the projections 8 on gear 6, but when its lower end is swung into the path of the projections one of the latter engages it and moves the dog in the direction of its length, thus causing the bell-crank lever to swing about the pivot 12 and move the shifter to carry the belt from the fast pulley to the loose pulley.

The frame C of the stop mechanism is herein illustrated as bolted at C' to a laundry mangle A which has one or more finger boards B arranged at or in proximity to the intake of the machine and connected for simultaneous operation by a link D. The finger boards control the stop mechanism in any suitable manner but in this instance an arm E on the shaft of one of the finger boards has a pull bar F connected thereto to establish connection with one arm of a bell crank lever 14 which is pivoted to a bracket 114 on the frame C and has its other arm provided with a projection 15 to coöperate with one side of the dog 9. Brackets 112 and 114 are also provided on the frame C on the opposite side of the vertical plane of shaft 2 in order that the positions of levers 12 and 14 may be changed when the frame C is attached to the opposite side of the mangle.

To the end that the belt may be retained in its shifted position there is employed a locking means which automatically becomes effected upon the shifting of the belt to the loose pulley. This locking means in this instance comprises a pawl 16 pivoted at 17 to a lever 18 in order to engage a fixed shoulder 21 when the shifter carries the belt to the loose pulley. The lever 18 also serves for manually shifting the belt from the loose pulley to the fast pulley, and for this purpose is pivoted at 19 to the frame C and at 20 to the slide 3.

In operation, the operative disengages the pawl or locking dog 16 from the fixed shoulder 21 and then moves the shifter, through the medium of the lever 18, to carry the belt from the loose pulley 5 to the fast pulley 1. The machine now operates until the belt is shifted in the reverse direction, either through the lever 18 or through the automatic stop mechanism. The latter is effected when the operative's hand or fingers engage and move either of the guards B to move the latter. This movement effects a pull on the rod F and causes the projection 15 on the bell-crank 15 to throw the lower end of the dog 9 into the path of one of the projections 8. One of the latter now engages the dog and moves the same in the direction of its length, thus effecting the turning of the bell crank lever 11 about its axis 12 and the shifting of the slide to carry the belt from the fast pulley to the loose pulley.

A stop mechanism constructed in accordance with this invention insures safety to the operatives. It does not depend upon the action of weights or springs for its power, but relies upon the motion of the parts which are the source of danger and consequently as long as these parts are moving there is provided power for operating the stop mechanism. Once the operation of the mechanism has been effected there is no danger that the machine will again start as the parts are automatically locked in their shifted position. The construction for effecting these results is simple in operation and not liable to get out of order, while the cost of manufacturing does not add materially to the cost of the machine.

I claim as my invention.

1. A stop mechanism comprising a rotatable member having a projection thereon, driven and driving members, a shifter for breaking connection between the driven and driving member, an oscillatory lever pivotally connected to the shifter for operating it, a dog pivotally mounted on the oscillatory lever, and means for moving the dog into the path of the projection on the rotatable member to cause the latter to effect the operation of the shifter.

2. A stop mechanism comprising a rotatable member having a projection thereon, driving and driven members, a shifter for breaking connection between the driven member and driving member, a bell crank lever having one arm connected to the shifter, a dog carried by the other arm of the bell crank lever, and means for moving said dog into the path of the projection on the rotatable member.

3. A stop mechanism comprising a pulley, a slidable belt shifter operating to move the belt from the pulley, a member rotatable with the pulley and provided with a projection, a bell-crank lever having one arm pivotally connected to the belt shifter, a dog carried by the other arm of the bell-crank lever, and means for adjusting said dog into the path of the projection on the rotary member.

4. A stop mechanism comprising a shaft having fast and loose pulleys and provided with a pinion, a gear wheel meshing with the pinion having a projection at one side thereof, a driving belt, a belt shifter mechanism embodying a transversely movable arm, a lever for operating it and a dog for actuating the arm depending at the side of the gear wheel, said lever being normally out of the path of the projection, and means for adjusting said dog into the path of said projection.

5. The combination with a driving shaft having fast and loose pulleys thereon and provided with a pinion and a gear wheel meshing therewith having a laterally extending projection, of a driving belt, a belt shifter movable transversely above the pulleys, and a member for operating it, an actuating arm depending from said member at the side of the gear wheel and means for swinging it laterally into the path of said projection.

6. A stop mechanism comprising a fast and a loose pulley, a slide carrying a belt shifter, a rotary member having a projection and driven with the fast pulley, a bell crank lever having one arm connected to the slide, a dog pivoted to the other arm of the bell crank lever, and means for moving said dog into the path of the projection.

7. A stop mechanism comprising a fast and a loose pulley, a slide carrying a belt shifter, a rotary member having a projection and driven with the fast pulley, a bell crank lever having one end connected to the slide, a dog pivoted to the other end of the bell crank lever, means for moving said dog into the path of the projection, a lever pivoted to the frame and to the slide, and a locking dog pivoted to the lever.

DANIEL M. COOPER.

Witnesses:
ROBT. F. LYON,
R. G. STALLKNIGHT.

Copies of this patent may be obtained for five cents each, by addressing the "Commissioner of Patents, Washington, D. C."